United States Patent
Aoki

(10) Patent No.: US 6,732,200 B1
(45) Date of Patent: May 4, 2004

(54) ABSORBING JITTER DURING DATA TRANSMISSION BETWEEN APPLICATIONS OPERATING AT DIFFERENT FREQUENCIES

(75) Inventor: Tetsuya Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/442,350

(22) Filed: Nov. 17, 1999

(30) Foreign Application Priority Data

Nov. 18, 1998 (JP) .......................... 10-328109

(51) Int. Cl.[7] .............................. G06F 3/00; G06F 13/14
(52) U.S. Cl. ............................. 710/60; 710/52; 710/29; 710/74; 710/305
(58) Field of Search .............................. 710/52–61, 29, 710/305, 62–74

(56) References Cited

U.S. PATENT DOCUMENTS

| 5,191,489 | A | * | 3/1993 | Isozaki | 360/64 |
|---|---|---|---|---|---|
| 5,237,554 | A | * | 8/1993 | Senshu et al. | 369/59.2 |
| 5,778,218 | A | * | 7/1998 | Gulick | 710/60 |
| 5,838,876 | A | * | 11/1998 | Iwamura | 386/125 |
| 5,915,130 | A | * | 6/1999 | Kim | 345/520 |
| 5,958,027 | A | * | 9/1999 | Gulick | 710/300 |
| 6,088,412 | A | * | 7/2000 | Ott | 375/372 |
| 6,202,164 | B1 | * | 3/2001 | Gulick | 713/400 |
| 6,529,971 | B1 | * | 3/2003 | Thiesfeld | 710/53 |
| 2002/0071655 | A | * | 9/1998 | Kanota et al. | 386/68 |

* cited by examiner

*Primary Examiner*—Sumati Lefkowitz
(74) *Attorney, Agent, or Firm*—Frommer Lawrence & Haug LLP; William S. Frommer; Bruno Polito

(57) ABSTRACT

A data processing circuit able to absorb jitter due to differences in operating frequencies between applications by a small-sized and inexpensive configuration when connecting a plurality of applications operating at various frequencies, including a DRAM and a memory controller which writes a digital audio signal input from a DSP into the DRAM on the basis of a clock signal from the DSP 5, then reads it out on the basis of a clock signal set for a D/A converter and outputs it to the D/A converter. Jitter absorption is achieved through a buffering scheme.

4 Claims, 7 Drawing Sheets

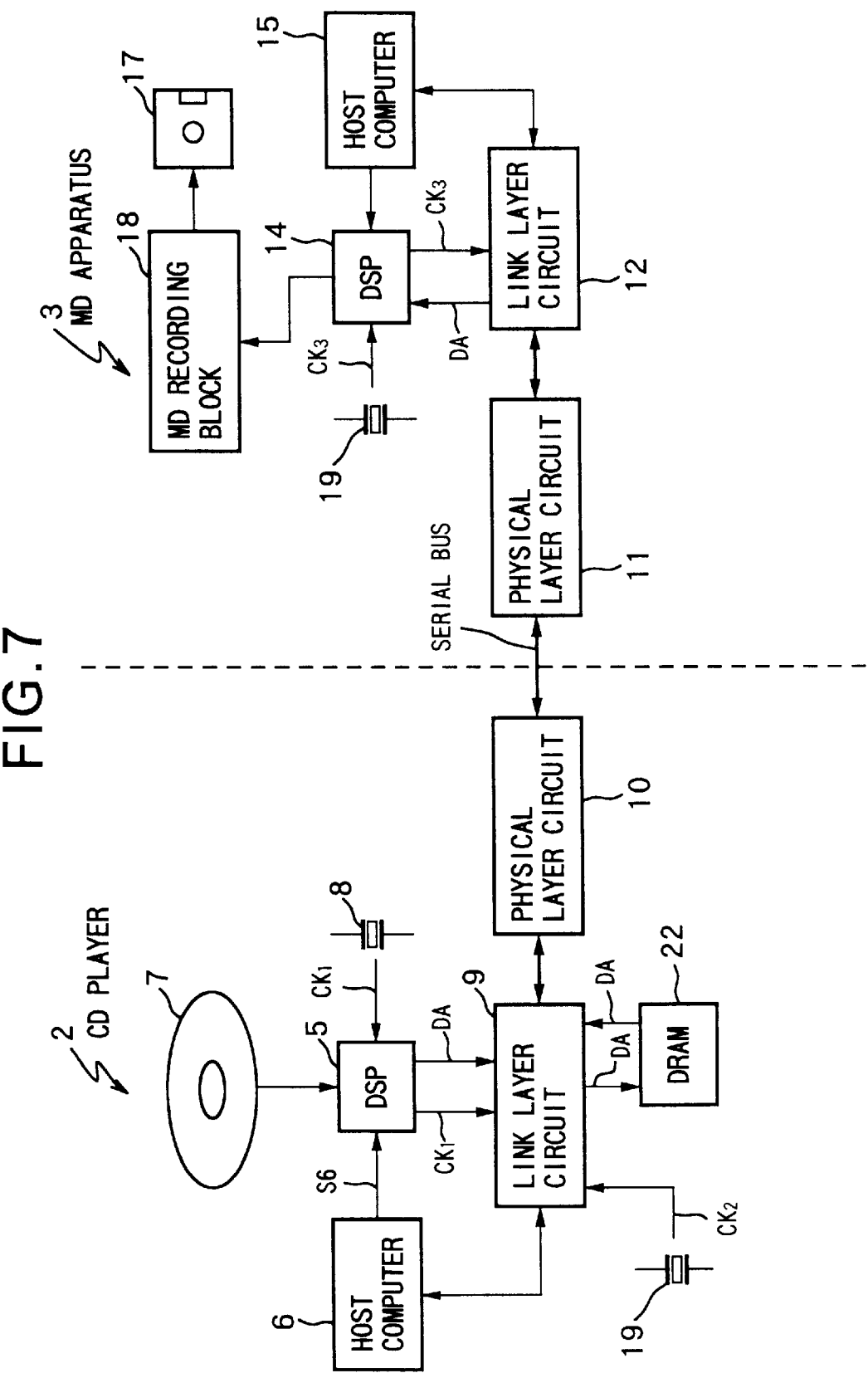

ABSORBING JITTER DURING DATA TRANSMISSION BETWEEN APPLICATIONS OPERATING AT DIFFERENT FREQUENCIES

BACKGROUND OF THE INVENTION

1. Field of the Invention

The present invention relates to a data processing circuit and a data transmission system.

2. Description of the Related Art

As an interface for multimedia data transfer, an IEEE (The Institute of Electrical and Electronic Engineers) 1394 serial interface which realizes high speed data transfer and real-time transfer has recently been standardized.

The data processing circuit of such an IEEE 1394 serial interface is mainly comprised of a physical layer circuit for directly driving an IEEE 1394 serial bus and a link layer circuit for controlling the data transfer of the physical layer. The physical layer circuits of a plurality of data processing circuits are connected through the IEEE 1394 serial bus and one or more applications are connected to the link layer circuits of the data processing circuits.

As applications, a CD (compact disk) player or MD (Mini Disc) player or other multimedia equipment, speakers, various computers, set top boxes, and other consumer products and hard disk drives and other data storage apparatuses etc. may be exampled.

In a system using the above IEEE 1394 serial interface, normally, asynchronous transfer for requesting data and confirming receipt and isochronous transfer for transferring data forcibly once every 125 $\mu$s are performed between an application connected to one data processing circuit and another application connected to another data processing circuit through the IEEE 1394 serial bus, and it is also possible to transfer data between a plurality of applications connected to one data processing circuit.

For example, it is possible to connect a CD player and a speaker to one data processing circuit to output digital audio data input from the CD player to the speakers and to convert a data of an analog format at a digital-to-analog (D/A) converter at the speakers and to thereby output sound according to the analog audio data.

When the frequency of the clock signal used at the D/A converter of the speaker is higher than the frequency of the clock signal used at the time of reproduction of the digital audio data at the CD player, a sampling rate converter (SRC) was used to compensate the audio data output from the CD player and output the compensated audio data to the speaker.

Summarizing the problems to be solved by the invention, as explained above, however, since an SRC was used, there was the problem that the system became larger in size and higher in price.

Further, it is possible to connect various applications operating at mutually different frequencies to the data processing circuit of an IEEE 1394 serial interface. It is not easy to determine the sampling rate of the SRC built in the data processing circuit.

Further, when transmitting data from one data processing circuit to another data processing circuit through the IEEE 1394 serial interface, a similar problem as explained above exists also when the operating frequencies of the application connected to the one data processing circuit and the application connected to another data processing circuit differ.

SUMMARY OF THE INVENTION

An object of the present invention is to provide a data processing circuit able to absorb the jitter due to the difference in operating frequencies between applications by a small sized and inexpensive configuration when connecting a plurality of applications operating at diverse frequencies.

Another object of the present invention is to provide a data processing circuit and data transmission system able to absorb jitter due to differences in operating frequencies of applications between a transmitting side and receiving side when transmitting data through a data transmission channel.

To solve the above problems and achieve the above objects, a data processing circuit according to a first aspect of the present invention is a data processing circuit for connecting a plurality of applications including a first application and a second application operating on the basis of clock signals of different frequencies, comprising a storage circuit and a storage control circuit for storing data input from the first application in the storage circuit on the basis of a first clock signal set for the operating frequency of the first application and then reading it out on the basis of a second clock signal set for the operating frequency of the second application.

In the data processing circuit of the first aspect of the present invention, data is input from the first application operating on the basis of the first clock signal and the input data is written by the storage control circuit in the storage circuit on the basis of the first clock signal.

Next, the data is read by the storage control circuit from the storage circuit on the basis of the second clock signal and the read data is output to the second application. At this time, the read operation of the data from the storage circuit is performed on the basis of the second clock signal serving as the basis of the operation of the second application, so the read data is processed at a high accuracy in the second application.

Further, by using a storage circuit absorbing the deviation between the first clock signal and the second clock signal (jitter) in this way, the size can be reduced and the cost lowered compared with the case of use of a conventional sampling rate converter.

Further, the data processing circuit of the first aspect of the present invention preferably further comprises an application control circuit for monitoring the storage state of the storage circuit and controlling the amount of the data which the first application outputs per unit time on the basis of the results of the monitoring. Further, the application control circuit controls the amount of the data which the first application outputs so that the storage circuit does not overflow or underflow.

Due to this, it is possible to avoid the storage circuit overflowing or underflowing and possible to ensure the continuity of the processing in the second application.

Further, a data processing circuit according to a second aspect of the present invention is a data processing circuit for outputting data received from another data processing circuit connecting a first application through a data transmission channel to a second application, comprising a receiving circuit for receiving data from the data transmission channel and reproducing a first clock set for an operating frequency of the first application carried in the received data, a storage circuit, and a storage control circuit for writing the received data in the storage circuit on the basis of the reproduced first clock signal and then reading it out on the basis of a second clock signal set for the operating frequency of the second application and outputting it to the second application.

In the data processing circuit of the second aspect of the present invention, data is received by the receiving circuit from the data transmission channel and the first clock signal carried in the received data is reproduced.

Next, the received data is written by the storage control circuit in the storage circuit on the basis of the reproduced first clock signal, then is read out on the basis of the second clock signal of a frequency different from the first clock signal and output to the second application.

Further, a data processing circuit according to a third aspect of the present invention is a data processing circuit for outputting data input from a first application through a data transmission channel to a second application connected to another data processing circuit, comprising a storage circuit, a storage control circuit for storing the data input from the first application to the storage circuit on the basis of a first clock signal set for the operating frequency of the first application and then reading it out on the basis of a second clock signal set for the operating frequency of the second application, and a transmission circuit for transmitting the data read out from the storage circuit through the data transmission channel to the another data processing circuit.

In the data processing circuit of the third aspect of the present invention, the data input from the first application is written by the storage control circuit in the storage circuit on the basis of the first clock signal set for an operating frequency of the first application.

Next, the written data is read by the storage control circuit on the basis of the second clock signal set for the operating frequency of the second application.

Further, the read data is transmitted by the transmission circuit through the data transmission channel to another data processing circuit to which the second application is connected.

Further, a data transmission system according to a first aspect of the present invention is a data transmission system comprising a first data processing circuit connecting to a first application and a second data processing circuit connecting to a second application connected through a data transmission channel, the first data processing circuit comprising a transmission circuit for transmitting data input from the first application through the data transmission channel to the second data processing circuit and the second data processing circuit comprising a receiving circuit for receiving data from the data transmission channel and reproducing a first clock signal set for the operating frequency of the first application, a storage circuit, and a storage control circuit for storing the received data in the storage circuit on the basis of the reproduced first clock signal and then reading out the data on the basis of a second clock signal set for the operating frequency of the second application and outputting it to the second application.

In the data transmission system of the first aspect of the present invention, in the first data processing circuit, the data input from the first application is transmitted from the transmission circuit through the data transmission channel to the second data processing circuit.

Further, in the second data processing circuit, the data is received by the receiving circuit from the data transmission channel and the first clock signal carried in the received data is reproduced. Further, the received data is written by the storage control circuit in the storage circuit on the basis of the reproduced first clock signal, then is read out on the basis of the second clock signal and output to the second application.

That is, in the data transmission system of the first aspect of the present invention, in the receiving side second data processing circuit, the jitter due to the difference in operating frequencies between the first application and the second application is absorbed.

Further, a data transmission system according to a second aspect of the present invention is a data transmission system comprising a first data processing circuit connecting to a first application and a second data processing circuit connecting to a second application connected through a data transmission channel, the first data processing circuit comprising a storage circuit, a storage control circuit for writing the data input from the first application to the storage circuit on the basis of a first clock signal set for the operating frequency of the first application and then reading it out on the basis of a second clock signal set for the operating frequency of the second application, and a transmission circuit for transmitting the data read out from the storage circuit through the data transmission channel to the second data processing circuit and the second data processing circuit comprising a receiving circuit for receiving the data through the data transmission channel from the first data processing circuit and outputting the received data to the second application.

In the data transmission system of the second aspect of the present invention, in the first data processing circuit, the data input from the first application is written by the storage control circuit in the storage circuit on the basis of the first clock signal and then read out on the basis of the second clock signal.

Further, the read data is transmitted by the transmission circuit to the data transmission channel and received by the receiving circuit of the second data processing circuit.

Further, the received data is output by the receiving circuit to the second application.

That is, in the data transmission system of the second aspect of the present invention, in the transmitting side first data processing circuit, the jitter due to the difference in operating frequencies between the first application and the second application is absorbed.

BRIEF DESCRIPTION OF THE DRAWINGS

These and other objects and features of the present invention will become clearer from the following description of the preferred embodiments given with reference to the accompanying drawings, in which:

FIG. 7 is a block diagram of the configuration of a second embodiment of an audio system according to another embodiment of the present invention.

DESCRIPTION OF THE PREFERRED EMBODIMENTS

Preferred embodiments of the present invention will be explained below:

First Embodiment

Figure 1:
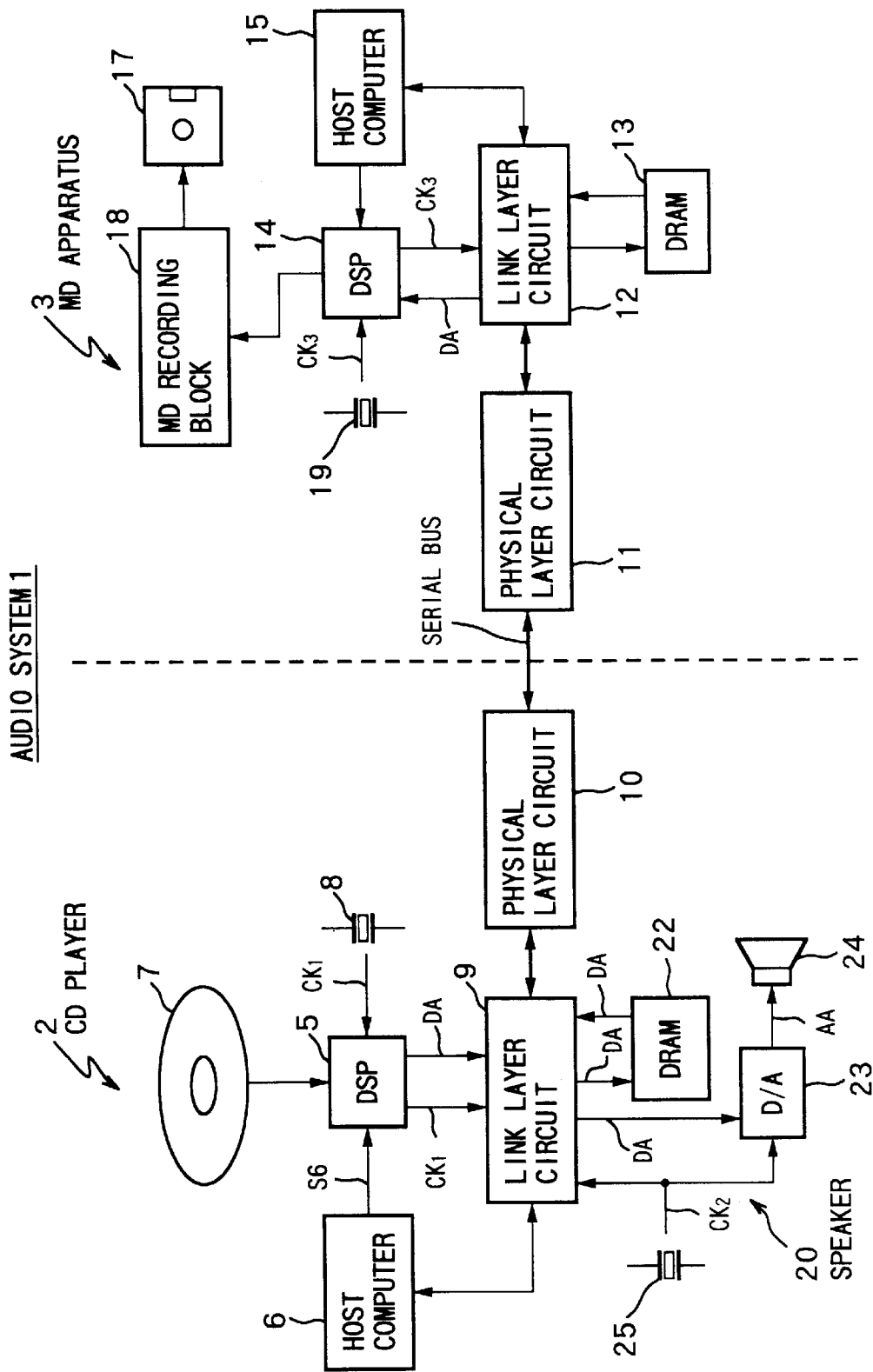
FIG. 1 is a block diagram of the configuration of a first embodiment of an audio system according to the present invention as applied to an IEEE 1394 serial interface.

FIG. 1 is a block diagram of the configuration of an audio system 1 according to an embodiment of the present invention using an IEEE 1394 serial interface.

The configuration of the audio system 1 will be explained next. As shown in FIG. 1, the audio system 1 comprises, for example, at one side of the IEEE 1394 serial bus BUS, a CD player 2, host computer 6, link layer circuit 9 (storage control circuit of the present invention), physical link circuit 10, speaker 20, and DRAM 22 (storage circuit of the present invention) and, at the other side, a physical link circuit 11, link layer circuit 12 (storage control circuit of the present invention), DRAM 13 (storage circuit of the present invention), host computer 15, and MD (mini-disk) apparatus 3.

In the audio system 1, for example, a CD player 2 and speaker 20 as applications are connected to a link layer circuit 9 and a digital audio signal DA output from the CD player 2 is output to a D/A converter 23 through a DRAM 22 under the control of the link layer circuit 9. The digital data is converted at the D/A converter 23 to an analog audio signal AA and a sound responsive to that is output from the speaker 24.

Further, in the audio system 1, for example, the digital audio signal DA reproduced at the CD player 2 is transmitted, without going through the DRAM 22, through the link layer circuit 9, physical layer circuit 10, IEEE 1394 serial bus BUS, physical layer circuit 11, and link layer circuit 12 to an MD apparatus 3 for recording on the MD 17.

At this time, the output of the digital audio data DA from the link layer circuit 9 to the D/A converter 23 through the DRAM 22 may be performed, or not, in parallel with the output of the digital audio signal DA from the link layer circuit 9 to the physical link circuit 10 not going through the DRAM 22.

Each of the components of the audio system 1 will be explained in detail next.

CD Player 2

The CD (compact disk) player 2 comprises a DSP 5 and a crystal oscillation circuit 8 and plays back an audio signal recorded on a CD 7.

The crystal oscillation circuit 8 generates a clock signal $CK_1$ of a frequency of at least 64 fs when the sampling frequency is "fs" and outputs this to the DSP 5.

The DSP 5 drives the rotation of the CD 7 under the control of the host computer 6, reproduces the digital audio signal DA recorded on the CD 7, and outputs it to the link layer circuit 9. At this time, the DSP 5 reproduces the digital audio signal DA in synchronization with the clock signal $CK_1$ from the crystal oscillation circuit 8. Further, the DSP 5 plays back the digital audio signal recorded on the CD 7 in accordance with a playback speed designated by the host computer 6.

Speaker 20

The speaker 20 comprises a D/A converter 23, a speaker unit 24, and a crystal oscillation circuit 25.

The crystal oscillation circuit 25 for example produces a clock signal $CK_2$ of a frequency different from the frequency of the above clock signal $CK_1$ and outputs it to the link layer circuit 9 and the D/A converter 23.

The D/A converter 23 is for example a so-called 1-bit D/A converter which converts a digital signal to an analog signal by pulse width modulation (PWM). It converts a digital audio signal DA input from the link layer circuit 9 to an analog audio signal AA in synchronization with the clock signal $CK_2$ and outputs the analog audio signal AA to the speaker unit 24.

The speaker unit 24 outputs sound corresponding to the analog audio signal AA.

Physical Layer Circuit 10

The physical layer circuit 10 performs an arbitration processing for the IEEE 1394 serial bus BUS.

At the time of transmission, the physical layer circuit 10 encodes the transmission packet data input from the link layer circuit 9 and outputs them to the IEEE 1394 serial bus BUS.

At the time of reception, the physical layer circuit 10 decodes the received packet data input from the IEEE 1394 serial bus BUS and outputs them to the link layer circuit 9. At this time, the physical layer circuit 10 drives a PLL (phase locked loop) circuit when not receiving packet data so as to reproduce a clock signal $CK_3$ superimposed in the packet data to be received and when receiving the packet data uses the reproduced clock signal $CK_3$ to decode the packet data.

Note that the clock signal $CK_3$ is output to the link layer circuit 9.

Link Layer Circuit 9 and DRAM 22

The link layer circuit 9 controls the asynchronous transfer and isochronous transfer and controls the physical link circuit 10, under the control of the host computer 6.

Figure 2:
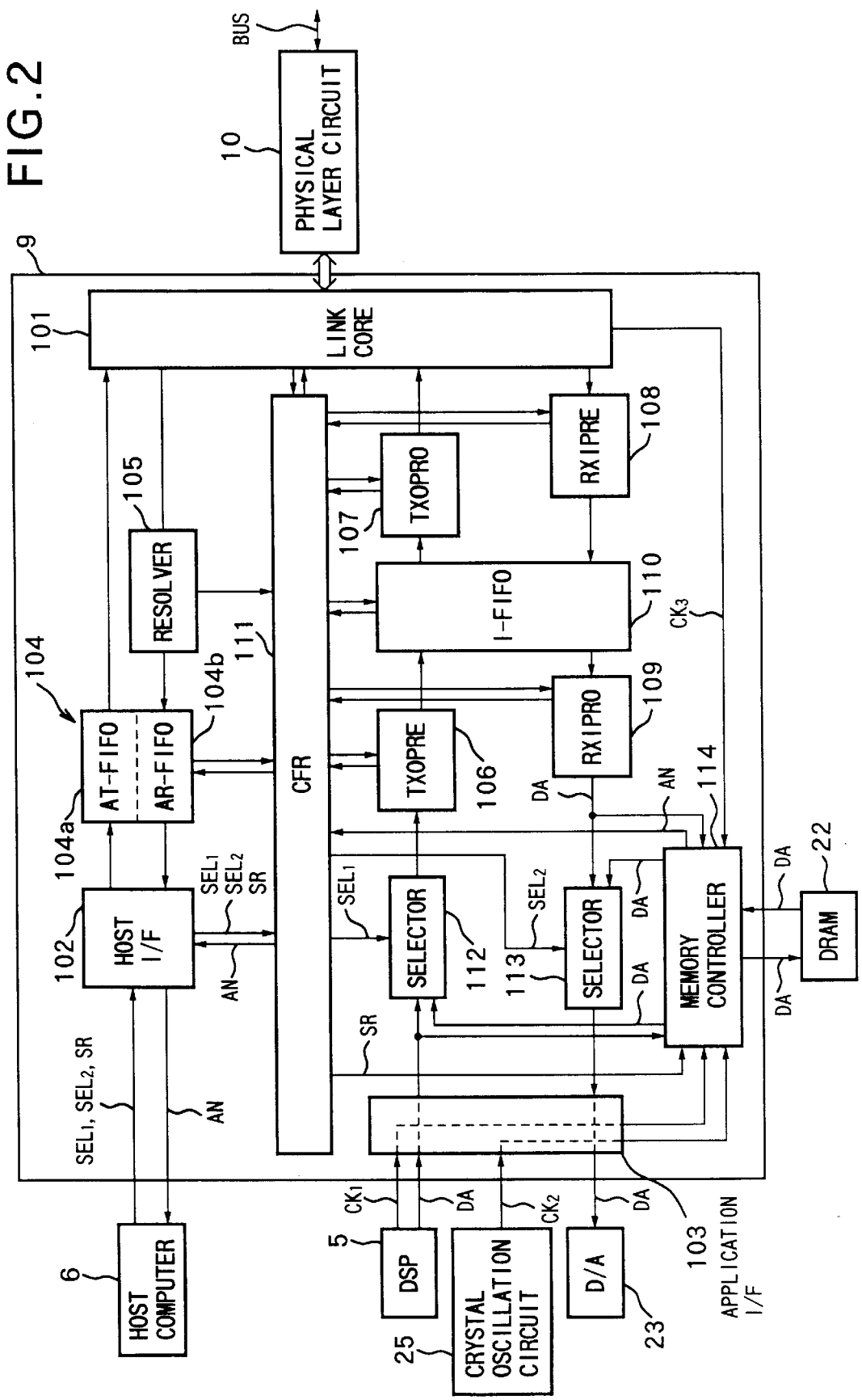
FIG. 2 is a view of the internal configuration of a link layer circuit.

FIG. 2 is a view of the configuration of the link layer circuit 9.

As shown in FIG. 2, the link layer circuit 9 comprises for example a link core 101, a host I/F (host interface) circuit 102, an application I/F circuit 103, an asynchronous communication FIFO 104 comprising a transmission FIFO (AT-FIFO) 104a and a reception FIFO (AR-FIFO) 104b, a self ID resolver 105, an isochronous communication transmission pre-processing circuit (TXOPRE) 106, an isochronous communication transmission post-processing circuit (TXOPRO) 107, an isochronous communication reception pre-processing circuit (RXIPRE) 108, an isochronous communication reception post-processing circuit (RXIPRO) 109, an isochronous communication FIFO (I-FIFO) 110, a configuration register (CFR) 111, selectors 112 and 113, and a memory controller 114.

In the link layer circuit 9 shown in FIG. 2, the application interface circuit 103, transmission pre-processing circuit 106, transmission post-processing circuit 107, reception pre-processing circuit 108, reception post-processing circuit 109, FIFO 110, link core 101, CFR 111, and memory controller 114 constitute an isochronous communication system circuit.

Further, the host interface circuit 102, asynchronous communication transmission FIFO 104a, reception FIFO 104b, link core 101, and CFR 111 constitute an asynchronous communication circuit.

[Isochronous Communication System Circuit]

The link core 101 is comprised of a transmission circuit and receiving circuit for asynchronous communication packet data and isochronous communication packet data, an interface circuit with the physical layer circuit 10 for directly driving the IEEE 1394 serial bus BUS for these packet data, a cycle timer reset every 125 μs, a cycle monitor, and a CRC circuit. Further, for example, the time data etc. of the cycle timer etc. is supplied through the CFR 111 to the isochronous communication system circuit.

When receiving a digital audio signal DA from the DSP 5 of the CD player 2, the application I/F circuit 103 biface demodulates the input digital audio signal DAA and outputs it to the selector 112 and the memory controller 114 and outputs the clock signal $CK_1$ input from the DSP 5 to the memory controller 114. Further, the application I/F circuit 103 outputs the clock signal CK$_2$ input from the crystal oscillation circuit 25 to the memory controller 114. Further, when receiving as input the digital audio signal DA from the selector 113, the application I/F circuit 103 biface modulates the input digital audio signal DA and outputs it to the D/A converter 23.

The selector 112 selects one of the digital audio signal DA from the application I/F circuit 103 and the digital audio signal DA read from the DRAM 22 by the memory controller 114 based on the selection signal SEL1 stored in the CFR 111 by the host computer 6 and outputs it to the transmission pre-processing circuit 106.

The selector 113 selects one of the digital audio signal DA from the reception pre-processing circuit 109 and the digital audio signal DA read from the DRAM 22 by the memory controller 114 based on the selection signal SEL2 written in the CFR 111 by the host computer 6 and outputs it to the application I/F circuit 103.

The transmission pre-processing circuit 106 receives as input the digital audio signal DA from the selector 112, adjusts the data length to quadlet (4 byte) units as the isochronous communication of the IEEE 1394 standard, then writes it in the FIFO 110. Further, the transmission pre-processing circuit 106 encrypts the digital audio signal DA input from the selector 112 in accordance with need.

Figure 3:
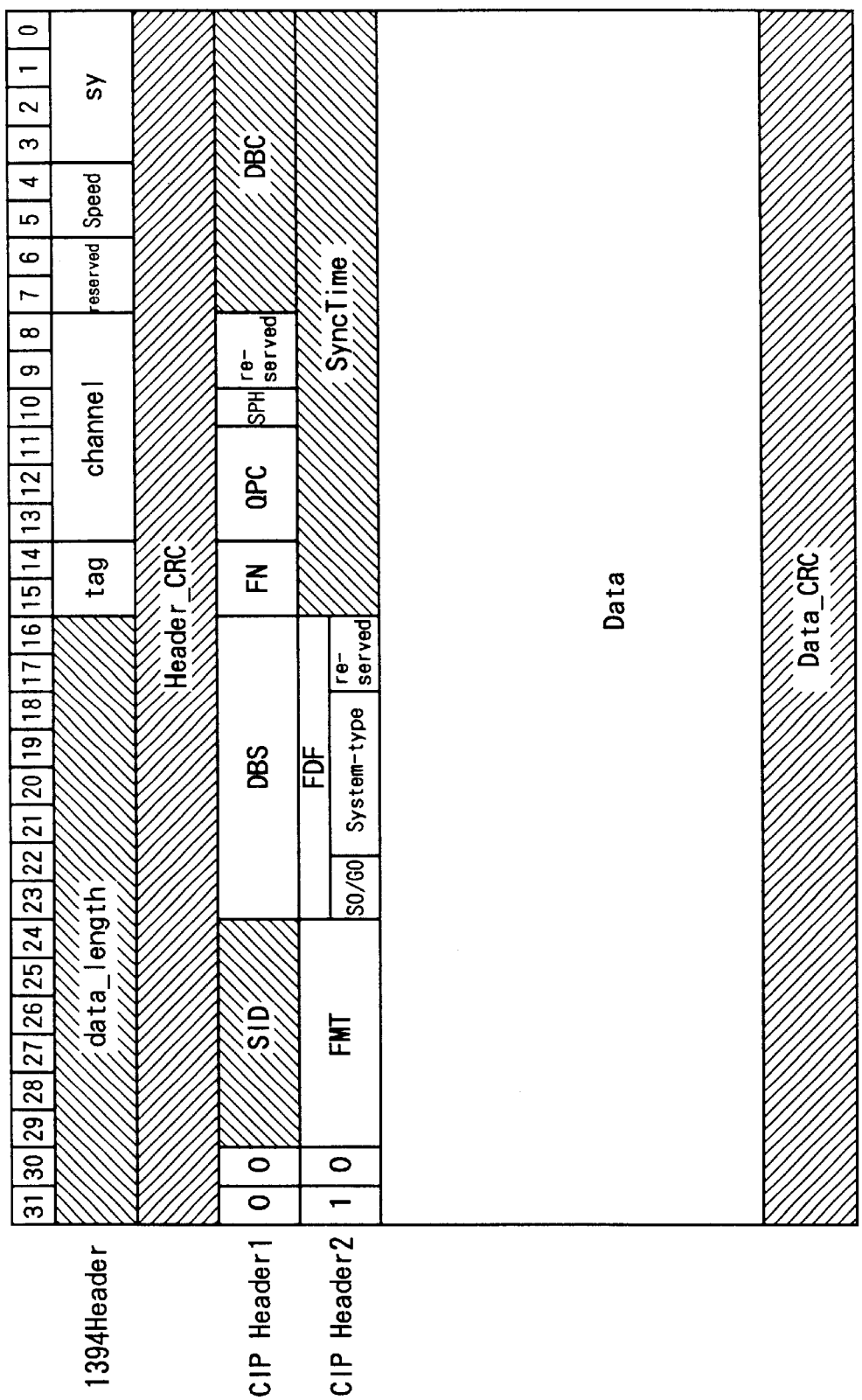
FIG. 3 is a view for explaining the format of a packet transmitted through an IEEE 1394 serial bus.

The transmission post-processing circuit 107 adds the 1394 header, header CRC, CIP headers 1 and 2, and data CRC to the data stored in the FIFO 110 as shown in FIG. 3 and outputs the result to the transmission circuit of the link core 101.

Specifically, as shown in FIG. 3, the transmission post-processing circuit 107 adds a 1394 header composed of a data-length region indicating the data length, a channel region indicating the number (one of 0 to 63) of the channel over which the packet data is to be transferred, a tcode region indicating the processing code, and synchronization code sy region defined by the application; a CIP header 1 composed of an SID (source node ID) region for the transmission node number, a DBS (data block size) region for a length of the data block, an FN (fraction number) region for the fraction number in packaging, a QPC (quadlet padding count) region for the number of quadlets of the padding data, an SPH region for a flag indicating an existence of the source packet header, and a DBC region for a counter for detecting the number of the isochronous packet data; and a CIP header 2 composed of an FMT region for a signal format indicating the kind of data to be transferred, an FDF (format dependent field) region used corresponding to the signal format, and a SyncTime region for time stamp information.

The reception pre-processing circuit 108 receives the isochronous communication packet data transferred by the IEEE 1394 serial bus BUS via the link core 101, analyzes the contents of the 1394 header, CIP headers 1 and 2, etc. of the received packet data, restores the digital audio signal contained in the packet data, and stores the restored digital audio signal in the FIFO 110.

The reception post-processing circuit 108 outputs the digital audio data read from the FIFO 110 to the selector 113 and, when the digital audio data DA is encrypted at that time, decrypts the digital audio signal DA.

The memory controller 114, in the case of output by the speaker 20 in accordance with the digital audio signal DA reproduced by the CD player 2 shown in FIG. 1, stores the digital audio signal DA output by the DSP 5 in the DRAM 22 on the basis of the clock signal CK, output by the DSP 5, then reads the written digital audio signal DA on the basis of the clock signal CK$_2$ output by the crystal oscillation circuit 25 and outputs it through the selector 113 and the application I/F circuit 103 to the D/A converter 23.

Further, the memory controller 114 monitors the state of storage of the digital audio signal DA in the DRAM 22 and stores into the CFR 111 an amount AN showing the amount of the valid digital audio signal DA stored in the DRAM 22. At this time, the memory controller 114 for example manages the memory region of the DRAM 22 by dividing it into 16 blocks having the same storage capacity and stores into the CFR 111 an amount AN showing in what number of blocks of the 16 blocks the digital audio signal DA has already been stored.

The DRAM 22 for example has a storage capacity of 64 Mbytes and records the digital audio signal DA. Note that the storage capacity of the DRAM 22 is not limited to 64 Mbytes and for example may be 4 Mbytes or 16 Mbytes.

[Asynchronous Circuit]

The host interface circuit 102 performs an arbitration processing for the write, read, and other operations of the asynchronous communication packet data between the host computer 6 and the transmission FIFO 104a and reception FIFO 104b and the arbitration processing for the transfer of various types of data from the host computer 6 to the CFR 111.

Further, the host interface circuit 102 reads the amount AN showing the state of storage of the DRAM 22 stored in the CFR 111 by the memory controller 114 and outputs this to the host computer 6. The host computer 6, as explained later, controls the DSP 5 to control the amount of the digital audio signal DA per unit time reproduced by the CD player 2 on the basis of that amount AN.

The transmission FIFO 104a stores the asynchronous communication packet data transmitted to the IEEE 1394 serial bus BUS, while the reception FIFO 104b stores the asynchronous communication packet data transmitted through the IEEE 1394 serial interface bus BUS.

The resolver 105 analyzes the content of the self ID packet data transmitted through the IEEE 1394 serial interface bus BUS at the time of bus reset and stores the same in the CFR 111.

Host Computer 6

The host computer 6 controls the DSP 5 to control the amount of the digital audio signal DA per unit time reproduced by the CD player 2 based on the amount AN read from the CFR 111 through the host interface circuit 102 of the link layer circuit 9.

Figure 4:
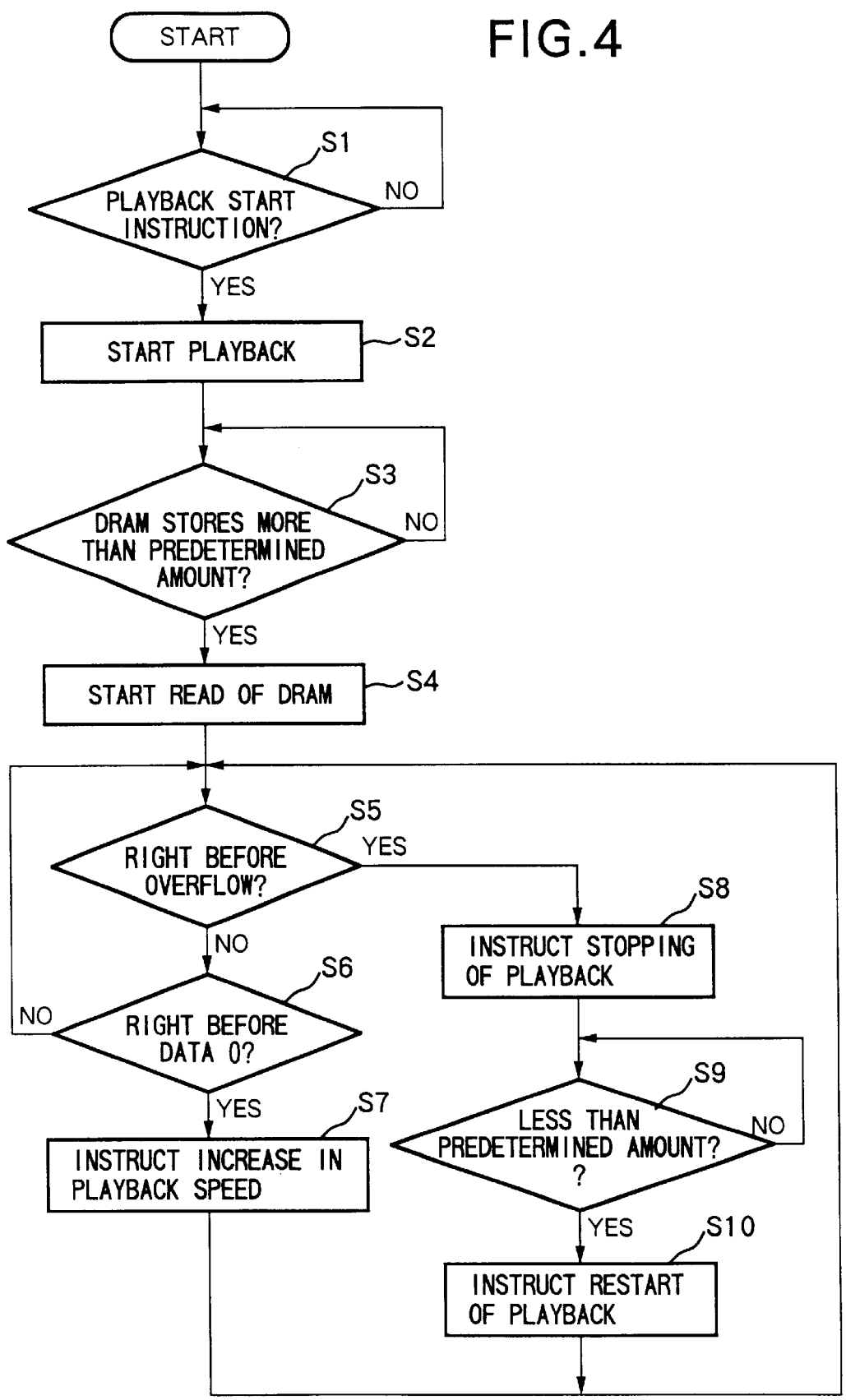
FIG. 4 is a flow chart of the control of a playback operation of a CD player by a host computer shown in FIG. 1.

FIG. 4 is a flow chart of the control of the playback operation of the CD player 2 by the host computer 6.

Step S1: A user operates a not shown operating means to instruct the start of the playback operation. The host computer then proceeds to the processing of step S2.

Step S2: The host computer 6 outputs the control signal S6 to the DSP 5 and starts the playback operation of the CD 7 by the DSP 5. Due to this, in the link layer circuit 9, the digital audio signal DA reproduced from the CD 7 by the DSP 5 is written in the DRAM 22 on the basis of the clock signal CK$_1$ under the control of the memory controller 114.

Step S3: The host computer 6 reads the amount AN showing the amount of data stored in the DRAM 22 from the CFR 111 through the host interface circuit 102. When judging that the amount is more than a predetermined value, for example, more than half of the storage capacity of the DRAM 22 (digital audio signal DA stored in at least 8 blocks of 16 blocks), the host computer 6 proceeds to the processing of step S4. When judging that it is not more than the predetermined value, it repeats the processing of step S3.

Step S4: The host computer 6 outputs the read instruction SR instructing the start of the read operation to the link layer circuit 9.

The read instruction SR is output at the link layer circuit 9 through the host interface circuit 102 and the CFR 111 to the memory controller 114. Due to this, at the link layer circuit 9, the digital audio signal DA is read from the DRAM 22 and output to the selector 112 on the basis of the clock signal $CK_2$ under the control of the memory controller 114.

Step S5: The host computer 6 reads the amount AN showing the amount of data stored in the DRAM 22 through the host interface circuit 102 from the CFR 111 and judges if the DRAM 22 is just about to overflow based on the amount AN.

Here, when the frequency of the clock signal $CK_2$ from the crystal oscillation circuit 25, supplied to the D/A converter 23, is lower than the clock signal $CK_1$ from the crystal oscillation circuit 8 supplied to the DSP 5, since the amount of the data of the digital audio signal DA read in a unit time from the DRAM 22 and output to the D/A converter 23 is smaller compared with the amount of data of the digital audio signal DA written in a unit time from the DSP 5 to the DRAM 22, the amount of data of the digital audio signal stored in the DRAM 22 is increased.

Figure 5:
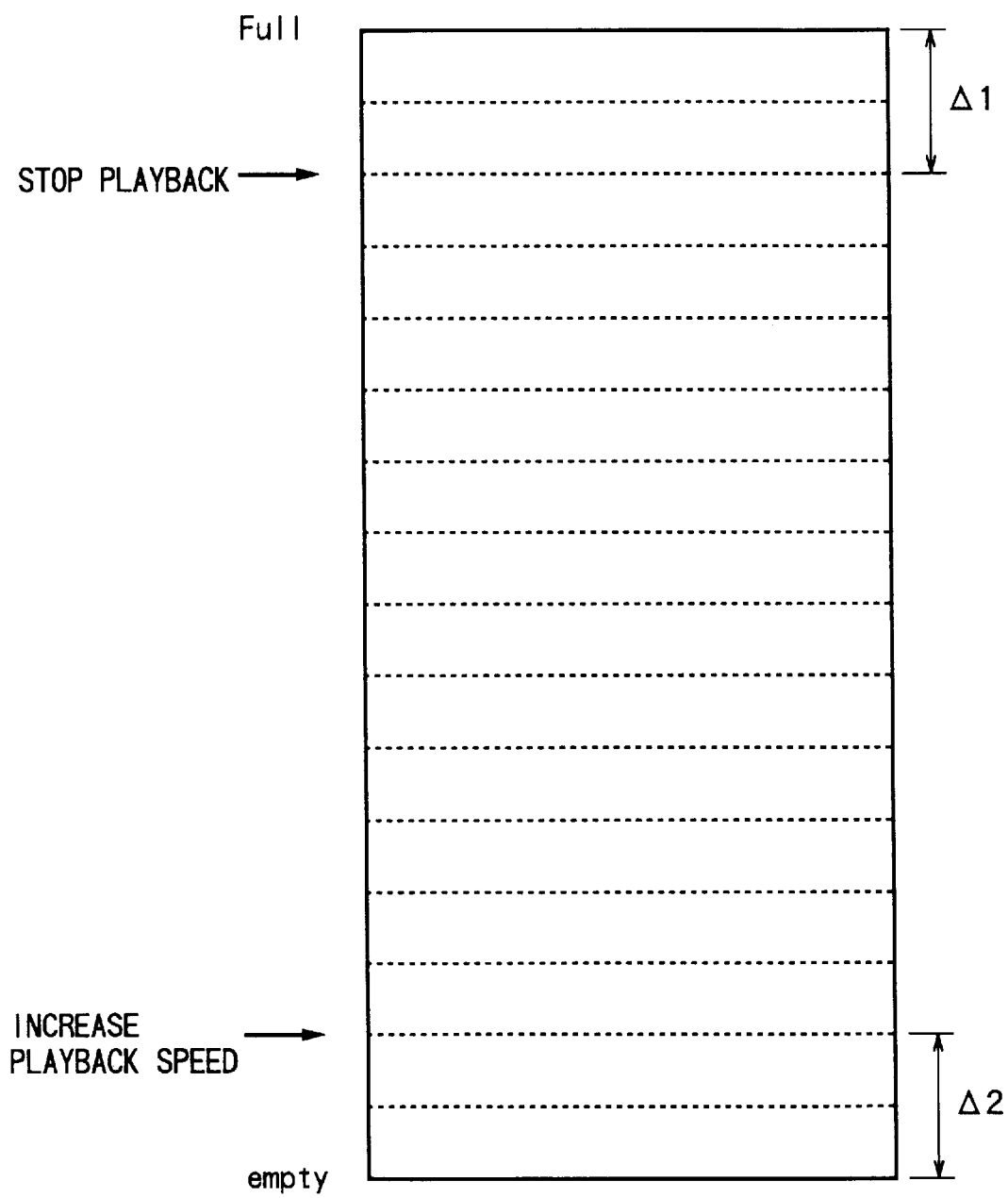
FIG. 5 is a view for explaining the relation between the storage region of a dynamic random access memory (DRAM) and the control of the host computer.

Therefore, the host computer 6 judges that the DRAM 22 is just about to overflow based on the amount AN and proceeds to the processing of step S8 shown in FIG. 4 when the free area of the DRAM 22 becomes less than the amount of data Δ1 (for example, 2 blocks' worth) corresponding to a delay time from the output of an instruction to stop playback of the CD 7 to the DSP 5 to the actual stopping of the playback operation by the DSP 5 (FIG. 5).

On the other hand, when the free area of the DRAM 22 is greater than the amount of data Δ1, the host computer 6 proceeds to the processing of step S6.

Step S6: The host computer 6 reads the amount AN showing the amount of data stored in the DRAM 22 from the CFR 11 through the host interface circuit 102 and judges based on that amount AN if the amount of data of the digital audio signal DA stored in the DRAM 22 is just before 0.

Here, when the frequency of the clock signal $CK_2$ from the crystal oscillation circuit 25 supplied to the D/A converter 23 is higher than that of the clock signal $CK_1$ from the crystal oscillation circuit 8 supplied to the DSP 5, since the amount of the data of the digital audio signal DA read out from the DRAM 22 and output to the D/A converter 23 in a unit time is greater than the amount of data of the digital audio signal DA written from the DSP 5 to the DRAM 22 in a unit time, the amount of data of the digital audio signal DA stored in the DRAM 22 is reduced.

Therefore, the host computer 6 judges that the amount of data is right before 0 (underflow) and proceeds to the processing of step S7 when the amount of data of the digital audio signal stored in the DRAM 22 becomes less than the amount of data Δ2 (for example, 2 blocks' worth) corresponding to the delay time from the output of an instruction to increase the playback speed of the CD 7 to the DSP 5 to when the speed of the playback operation by the DSP 5 is actually increased (FIG. 5).

On the other hand, when the amount of data of the digital audio signal DA stored in the DRAM 22 is larger than the amount of data Δ2, the host computer 6 repeats the processing of step S5.

Step S7: The host computer 6 increases the speed of playback of the CD 7 by the DSP 5 based on the control signal S6 output to the DSP 5.

Step S8: The host computer 6 stops the playback of the CD 7 by the DSP 5 based on the control signal S6 output to the DSP 5.

Step S9: The host computer 6 reads the amount AN showing the amount of data stored in the DRAM 22 from the CFR 11 through the host interface circuit 102 and judges based on the amount AN if the amount of data of the digital audio signal stored in the DRAM 22 is below a predetermined value. When it judges that it is below the predetermined amount, it proceeds to the processing of step S10, while when not it repeats the processing of step S9.

Step S10: The host computer 6 restarts the playback of the CD 7 by the DSP 5 based on the control signal S6 output to the DSP 5. Then, the host computer 6 repeats the processing of step S5.

Physical Layer Circuit 11

The physical link circuit 11 is connected to the physical link circuit 10 through the IEEE 1394 serial bus BUS and has the same configuration and function as the physical link circuit 10.

That is, at the time of reception, the physical link circuit 11 decodes the received packet data input from the IEEE 1394 serial bus BUS and outputs them to the link layer circuit 12. At this time, the physical link circuit 11 drives the PLL circuit when not receiving packet data so as to reproduce the clock signal $CK_1$ carried in the packet data to be received and, when receiving packet data, uses the clock signal $CK_1$ to decode the packet data.

Note that the clock signal $CK_1$ is output to the link layer circuit 12.

Link Layer Circuit 12 and DRAM 13

The DRAM 13 is the same as the DRAM 22 explained above for example.

Figure 6:
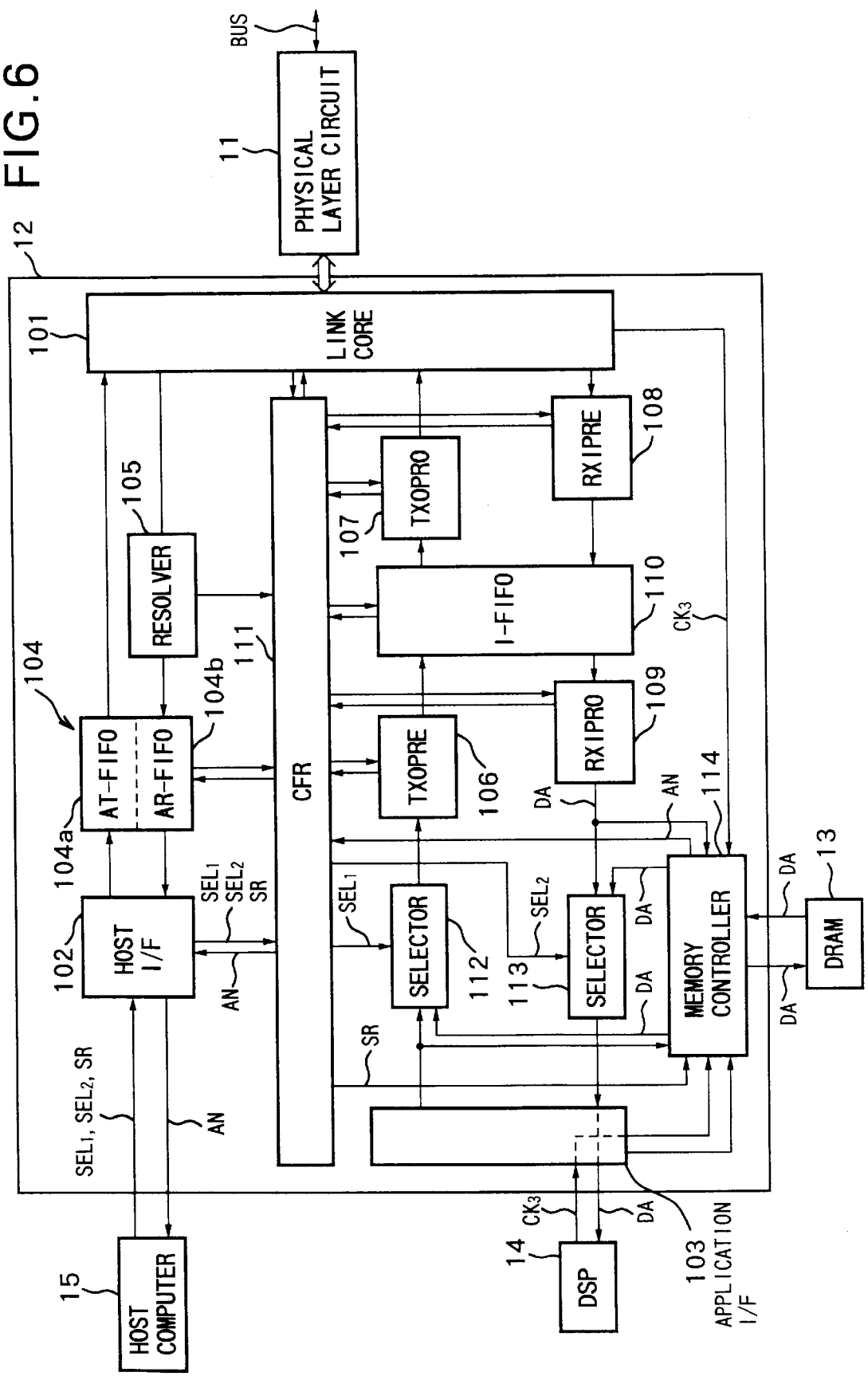
FIG. 6 is a view for explaining a mode of connection of the link layer circuit and digital signal processor (DSP) of an MD apparatus.

The link layer 12, as shown in FIG. 6, is configured the same as the link layer circuit 9 shown in FIG. 2 except for the application connected to the application I/F circuit 103.

That is, in the link layer circuit 12, the DSP 14 of the MD apparatus 3 is connected as an application to the application I/F circuit 103, a digital audio signal DA output by the CD player 2 is received through the IEEE 1394 serial bus BUS, and the received digital audio signal DA is output for example through the reception pre-processing circuit 108, FIFO 110, reception post-processing circuit 109, DRAM 13, selector 113, and application I/F circuit 103 to the DSP 14 and recorded in the MD 17 by the MD recording block 18.

At this time, the memory controller 114 stores the digital audio signal DA input from the reception post-processing circuit 109 in the DRAM 13 on the basis of the clock signal $CK_1$ input from the physical link circuit 11 through the link core 101. Further, the memory controller 114 reads the digital audio signal DA written in the DRAM 13 on the basis of the clock signal $CK_3$ output by the crystal oscillation circuit 19 and outputs it to the DSP 14 through the selector 113 and the application I/F circuit 103.

Host Computer 15

The host computer 15 is basically the same as the host computer 6 explained above except for the point relating to the control of the DSP 14 of the MD apparatus 3.

MD Apparatus 3

The MD (mini-disk) apparatus 3 comprises, as shown in FIG. 1, a DSP 14, an MD recording block 18, and a crystal oscillation circuit 19 and records the digital audio signal DA from the link layer circuit 12 on the MD 17 on the basis of the clock signal $CK_3$ output by the crystal oscillation circuit 19 based on the control of the MD recording block 18 by the DSP 14.

Here, the crystal oscillation circuit 19 produces a clock $CK_3$ of a frequency different from the frequencies of the above clocks $CK_1$ and $CK_2$ for example.

Below, an explanation will be given of operating modes of the audio system 1 shown in FIG. 1 as a whole.

First Operating Mode

In this operating mode, operation in the case of not transmitting the digital audio signal DA through the IEEE 1394 serial bus BUS, but outputting sound in accordance with the digital audio signal reproduced by the CD player 2 from the speaker 20 will be explained.

First, when an instruction is given to start the reproduction operation by the user operating a not shown operating means, a control signal S6 is output from the host computer 6 to the DSP 5. In the DSP 5, a playback operation of the CD 7 based on the clock signal $CK_1$ is started. The digital audio signal DA reproduced from the CD 7 and the clock signal $CK_1$ produced by the crystal oscillation circuit 8 are output to the link layer circuit 9.

As a result, in the link layer circuit 9, the digital audio signal DA input from the DSP 5 is written to the DRAM 22 on the basis of the clock $CK_1$ under the control of the memory controller 114.

Further, as explained above in step S3 and S4 shown in FIG. 4, when the amount AN showing the amount of data stored in the DRAM 22 is read from the CFR 111 to the host computer 6 through the host interface circuit 102 and it is judged that the amount of data is at least half of the storage capacity of the DRAM 22 for example, a read instruction SR instructing the start of the read operation is output from the host computer 6 to the memory controller 114 through the host interface circuit 102 and the CFR 111.

As a result, at the link layer circuit 9, the digital audio signal DA is read from the DRAM 22 and output to the selector 114 on the basis of the clock signal $CK_2$ under the control of the memory controller 114.

At this time, the DSP 5 is controlled by the host computer 6 as shown in FIG. 4 based on the amount AN read from the CFR 111 and thereby the amount of data of the digital audio signal DA per unit time reproduced by the CD player 2 is controlled.

The digital audio signal DA read from the DRAM 22 is output from the selector 113 through the application I/F circuit 103 to the D/A converter 23. Thee D/A converter 23 converts the digital audio signal DA to an analog audio signal AA on the basis of the reference clock signal $CK_2$ from the crystal oscillation circuit 25, then outputs it to the speaker unit 24. As a result, a sound corresponding to the analog audio signal AA is output from the speaker unit 24.

Second Operating Mode

In this operating mode, an explanation will be given of the case of transmitting a digital audio signal DA reproduced by a CD player 2 through an IEEE 1394 serial bus BUS to the physical link circuit 11 while outputting a sound corresponding to the digital audio signal DA from a speaker 20.

In this case, the following operation is performed in parallel with the operation explained in the above first operating mode.

That is, the digital audio signal DA output from the DSP 5 of the CD player 2 to the link layer circuit 9 is output through the application I/F circuit 103 shown in FIG. 2 to the memory controller 114 as explained above and also is output to the selector 112. The digital audio signal DA is output from the selector 112 to the transmission pre-processing circuit 106.

Further, the digital audio signal DA is output through the selector 112 to the transmission pre-processing circuit 106. At the transmission pre-processing circuit 106, the data length is adjusted to quadlet (4 byte) units for isochronous communication, then the data is written in the FIFO 110.

Next, the data containing the source packet header stored in the FIFO 110 is read to the transmission post-processing circuit 107 where the 1394 header, CIP headers 1 and 2, etc. shown in FIG. 3 are added to produce packet data. The packet data are output to the link core 101.

Next, the packet data output from the transmission post-processing circuit 107 to the link core 101 are output to the physical link circuit 11 every 125 µs, encoded at the physical layer circuit 10, then output through the IEEE 1394 serial bus BUS to the physical link circuit 11.

Next, at the physical link circuit 11, the received packet data are decoded and the clock signal $CK_1$ carried in the received packet data reproduced. The clock signal $CK_1$ is output through the link core 101 to the memory controller 114.

Next, the received packet data are output through the link core 101 to the reception pre-processing circuit 108. At the reception pre-processing circuit 108, the 1394 header, CIP headers 1 and 2, and other content contained in the received packet data are analyzed, the digital audio signal contained in the received packet data is restored, and the restored digital audio signal is written in the FIFO 110.

Next, the digital audio signal DA is read from the FIFO 110 and for example written in the DRAM 13 by the memory controller 114 on the basis of the clock signal $CK_1$.

Next, the digital audio signal DA is read by the memory controller 114 from the DRAM 13 on the basis of the clock signal $CK_3$ from the DSP 14 and is output through the selector 113 and the application I/F circuit 103 to the DSP 14.

Next, the digital audio signal DA is written in the MD apparatus 17 on the basis of the clock signal $CK_3$ by the MD recording block 18 under the control of the DSP 14.

As explained above, according to the audio system 1, even when connecting a CD player 2 and speaker 20 with different reference clock signals from each other at the time of operation as applications to the link layer circuit 9 shown in FIG. 1, it is possible to absorb the deviation between reference clock signals (jitter) by the DRAM 22 and possible to have the D/A converter 23 convert the digital audio signal DA reproduced by the CD player 2 to an analog audio signal AA with a high accuracy. As a result, it is possible to output a high quality sound in accordance with the analog audio signal AA to the speaker unit 24.

Further, according to the audio system 1, there is no need to use a sampling rate converter and therefore the apparatus can be made smaller in size and lower in cost.

Further, according to the audio system 1, since the host computer 6 monitors the state of storage of the DRAM 22 and controls the playback operation of the CD 7 by the DSP 5, it is possible to avoid the DRAM 22 overflowing or the digital audio signal DA read from the DRAM 22 running out (underflowing) and therefore possible to have the speaker 20 continuously output sound in accordance with the digital audio signal DA without interruption.

Further, according to the audio system 1, as explained in the above second operating mode, it is possible to monitor a high quality sound in accordance with the digital audio signal DA at the speaker unit 24 when recording a digital audio signal DA reproduced by the CD player 2 in the MD apparatus 3 through the IEEE 1394 serial bus BUS.

Further, according to the audio system 1, as explained in the above second operating mode, it is possible to write a high quality digital audio signal DA free from the effect of jitter in the MD apparatus 17 by the DSP 14 by having the link layer circuit 12 perform asynchronously a write operation to the DRAM 13 of the digital audio signal DA received from the CD player 2 through the IEEE 1394 serial bus BUS and a read operation from the DRAM 13 of the digital audio signal DA to the DSP 14.

Second Embodiment

A second embodiment of the present invention will be described with reference to FIG. 7.

In the first embodiment, the example was shown of the case of providing a DRAM 13 at the receiving side of a digital audio signal DA, but, in the second embodiment, for example, as shown in FIG. 7, when the receiving side is not provided with a DRAM 13 and a digital audio signal DA is not output to the D/A converter 23, by reading out, on the basis of a clock signal $CK_3$ output from the crystal oscillation circuit 19, a digital audio signal DA written in the DRAM 22 from the CD player 21 on the basis of the reference clock signal $CK_1$ and outputting it through the IEEE 1394 serial bus BUS to the link layer circuit 12, it is possible to absorb the jitter between the clock signal $CK_1$ of the CD player 2 and the clock signal $CK_3$ of the MD apparatus at the DRAM 22.

By doing this, it is possible to absorb the jitter at the transmission side even when there is no DRAM for absorbing jitter at the receiving side of the digital audio signal.

The present invention is not limited to the above embodiments.

For example, in the above embodiments, the example was shown of connecting a CD player 2 and speaker 20 as applications to the link layer circuit 9, but there may be any types and numbers of the applications connected to the application I/F circuit 103 of the link layer circuit 9 so long as the data output from one application is input to another application for processing and the operating frequencies differ between these applications.

Further, similarly, the application connected to the link layer circuit 12 is not limited to an MD apparatus 3.

Further, in the above embodiments, as applications, the example was shown of one reproducing, outputting, and recording a digital audio signal, but the present invention may also be applied to a case of connecting an application for reproducing, outputting, and recording video data to the link layer circuit.

Further, in the second operating mode of the first embodiment explained above, the example was shown of the case of transmitting a digital audio signal DA reproduced by the CD player 2 through an IEEE 1394 serial bus BUS to the physical link circuit 11 and outputting a sound corresponding to that digital audio signal DA from the speaker 2, but it is also possible to transmit the digital audio signal DA reproduced by the CD player 2 through the IEEE 1394 serial bus BUS to the physical link circuit 11. In this case as well, the effect is obtained of the receiving side DRAM 13 absorbing the jitter due to the difference in operating frequencies between the CD player 2 and the MD apparatus 3.

Further, the control by the host computer 6 of the playback operation by the CD player 2 is not particularly limited to that shown in FIG. 4 so long as it ensures that the DRAM 2 does not overflow and the stored digital audio signal DA does not disappear.

Further, the above embodiments, a DRAM was shown as the storage circuit for absorbing jitter, but an SRAM etc. may also be used in addition to a DRAM.

Summarizing the effects of the present invention, according to the data processing circuit of the present invention, it is possible to absorb the jitter due to the difference in operating frequencies between a first application and a second application by a small sized and inexpensive configuration and to perform high accuracy processing at the second application.

Further, according to the data processing circuit of the present invention, by providing the application control circuit, it is possible to avoid the storage circuit overflowing or underflowing and possible to ensure the continuity of the processing in the second application.

Further, according to the data processing circuit of the present invention, it is possible to absorb the jitter due to the difference in operating frequencies and to perform high accuracy processing at the first application also when connecting to a first application operating at a frequency different from the second application connected to another data processing circuit on the transmission side.

Further, according to the data processing circuit of the present invention, it is possible to absorb the jitter due to the difference in operating frequencies and to perform high accuracy processing at the second application connected to another data processing circuit also when connecting to a first application operating at a frequency different from the second application connected to another data processing circuit on the receiving side.

Further, according to the data transmission system of the present invention, it is possible to absorb the jitter due to the difference in operating frequencies between a first application connected to a first data processing circuit and a second application connected to a second data processing circuit and to perform high accuracy processing at the second application.

What is claimed is:

1. A data processing circuit for connecting a plurality of applications including a first application and a second application operating on the basis of clock signals of different frequencies, said data processing circuit comprising:

a storage circuit;

a storage control circuit for storing data input from the first application in the storage circuit on the basis of a first clock signal set for the operating frequency of the first application and then reading it out on the basis of a second clock signal set for the operating frequency of the second application; and a transmission circuit for outputting the data input from said first application to a data transmission channel at predetermined time intervals without going through said storage circuit.

2. A data processing circuit as set forth in claim 1, wherein said storage control circuit stores the data input from the first application in the storage circuit and reads it from said storage circuit to said second application in parallel with the output of data by the transmission circuit.

3. A data processing circuit as set forth in claim 1, wherein said data transmission channel comprises a serial bus.

4. A data processing circuit as set forth in claim 1, wherein said transmission circuit outputs the data to the data transmission channel in packet data.

* * * * *